US010805587B1

United States Patent
Wilfred (10) Patent No.: US 10,805,587 B1
(45) Date of Patent: Oct. 13, 2020

(54) SYSTEM AND METHODS FOR ENABLING AUTOMATIC WHITE BALANCE CORRECTION FOR COLOR CAMERAS

(71) Applicant: ZEBRA TECHNOLOGIES CORPORATION, Lincolnshire, IL (US)

(72) Inventor: Sajan Wilfred, Kollam (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/506,810

(22) Filed: Jul. 9, 2019

(51) Int. Cl.
| | |
|---|---|
| H04N 9/73 | (2006.01) |
| G06T 7/80 | (2017.01) |
| G06T 7/90 | (2017.01) |
| G06T 7/00 | (2017.01) |
| H04N 5/247 | (2006.01) |
| G06K 7/14 | (2006.01) |
| G06K 7/10 | (2006.01) |
| G06T 7/70 | (2017.01) |

(52) U.S. Cl.
CPC .......... *H04N 9/73* (2013.01); *G06K 7/10722* (2013.01); *G06K 7/1413* (2013.01); *G06T 7/70* (2017.01); *G06T 7/80* (2017.01); *G06T 7/90* (2017.01); *G06T 7/97* (2017.01); *H04N 5/247* (2013.01); *G06T 2207/10024* (2013.01)

(58) Field of Classification Search
CPC .. H04N 9/70; H04N 7/93; H04N 7/90; H04N 7/97; H04N 5/247; G06T 7/80; G06T 7/1413; G06T 7/10722
USPC ....................................... 348/223.1
See application file for complete search history.

(56) References Cited

U.S. PATENT DOCUMENTS

| | | | |
|---|---|---|---|
| 2015/0055854 A1* | 2/2015 | Marchesotti | G06F 16/50 382/159 |
| 2016/0139387 A1* | 5/2016 | Virk | G02B 21/365 348/79 |

* cited by examiner

*Primary Examiner* — Usman A Khan
(74) *Attorney, Agent, or Firm* — Yuri Astvatsaturov (57) ABSTRACT

A method is disclosed for automatic white balance correction of color cameras. The method includes capturing a first image of a target object, the first image containing a calibration area defined by a symbology and a calibration zone within the calibration area. The symbology encodes data and has first-color elements and second-color elements. The calibration zone is defined by at least some of at least one of the first-color elements and second-color elements. The method includes obtaining a location of the calibration area in the first image, and capturing a second image of the target object, the second image being multicolor. The method includes locating the calibration area in the second image based on the location, and analyzing the calibration zone within the calibration area of the second image. The method includes calculating and applying at least one white balance compensation bias based on the analyzed calibration zone.

20 Claims, 6 Drawing Sheets

SYSTEM AND METHODS FOR ENABLING AUTOMATIC WHITE BALANCE CORRECTION FOR COLOR CAMERAS

BACKGROUND OF THE INVENTION

Barcode reading systems have been ubiquitous throughout the retail industry and others for decades to read barcodes featured on products. The imaging systems included in barcode reading systems typically include color cameras. Color cameras are expected to produce color images featuring an accurate representation of product color, particularly because the images are used for applications such as object recognition. Achieving an accurate representation of color is accomplished, in part, by correcting the white balance of a color camera.

Traditionally, to correct white balance, a user would show a known white plane to the field of view of the color camera. Based on the resulting image, the imaging system would compute compensation biases for the primary colors, and save those compensation biases for further application to the color camera's subsequently captured frames.

However, a predefined white balance calibration is not an effective solution to compensate for changing store lighting conditions. These conditions can vary during the course of a day due to changes in ambient light conditions. Thus, traditional barcode reading systems do not possess the ability to perform automatic white balance correction for a color camera. Accordingly, there is a need for solutions that solve issues regarding scanners that cannot perform automatic white balance correction for a color camera.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In various embodiments of the present disclosure, a system, and related methods, are described for automatic white balance correction of color cameras. The system, and related methods, of the present disclosure provide solutions where, e.g., a barcode reading device is required to capture color images with accurate color representation regardless of ambient lighting conditions.

Traditional methods apply a singular white balance correction for every image captured by a color camera until a subsequent white balance correction is performed. For example, under traditional methods, an image captured when the ambient lighting is dim received the same white balance correction as an image captured when the ambient lighting was bright. However, due to the color variations inherent in different amounts of natural and other external light sources (e.g., incandescent, fluorescent, and/or light-emitting diode (LED) lighting in a store), a single white balance correction which neglects the contemporaneous influence of ambient light on images taken throughout the day is inherently flawed.

To illustrate, as customers check out at a point-of-sale (POS) station, they will routinely purchase multiple items. The amount of time taken to scan every item purchased by an individual customer may define a transaction period that spans several minutes. Accordingly, the transaction period will typically not extend over a duration resulting in large changes in the amount or quality of ambient light. Moreover, the customer may purchase several identical items, such that the images captured of those items will require a similar white balance calibration. Thus, the white balance correction calculated at the beginning of a transaction period may be sufficient for the remainder of the transaction period. However, durations between successive transaction periods may be long enough to result in a large change in the amount or quality of ambient light such that a single white balance calibration calculated at a particular time of day will not suffice for a subsequent transaction period.

Thus, the system and methods of the present disclosure seek to solve this problem with traditional white balance correction methods by performing an automatic white balance correction. Generally, the system and methods described herein perform an independent white balance correction for images captured throughout the day by the color camera based on a calibration area identified in each image. The calibration area contains a calibration zone which is analyzed to determine the amount of white balance correction required for the captured image.

In this way, the system and methods of the present disclosure overcome the limitations of traditional methods by eliminating the ambient light sensitivity of the white balance calibration. In other words, changing ambient light conditions will no longer systemically affect the resulting color representation of a captured image because the white balance calibration is performed at various points throughout a given day.

Figure 1A:
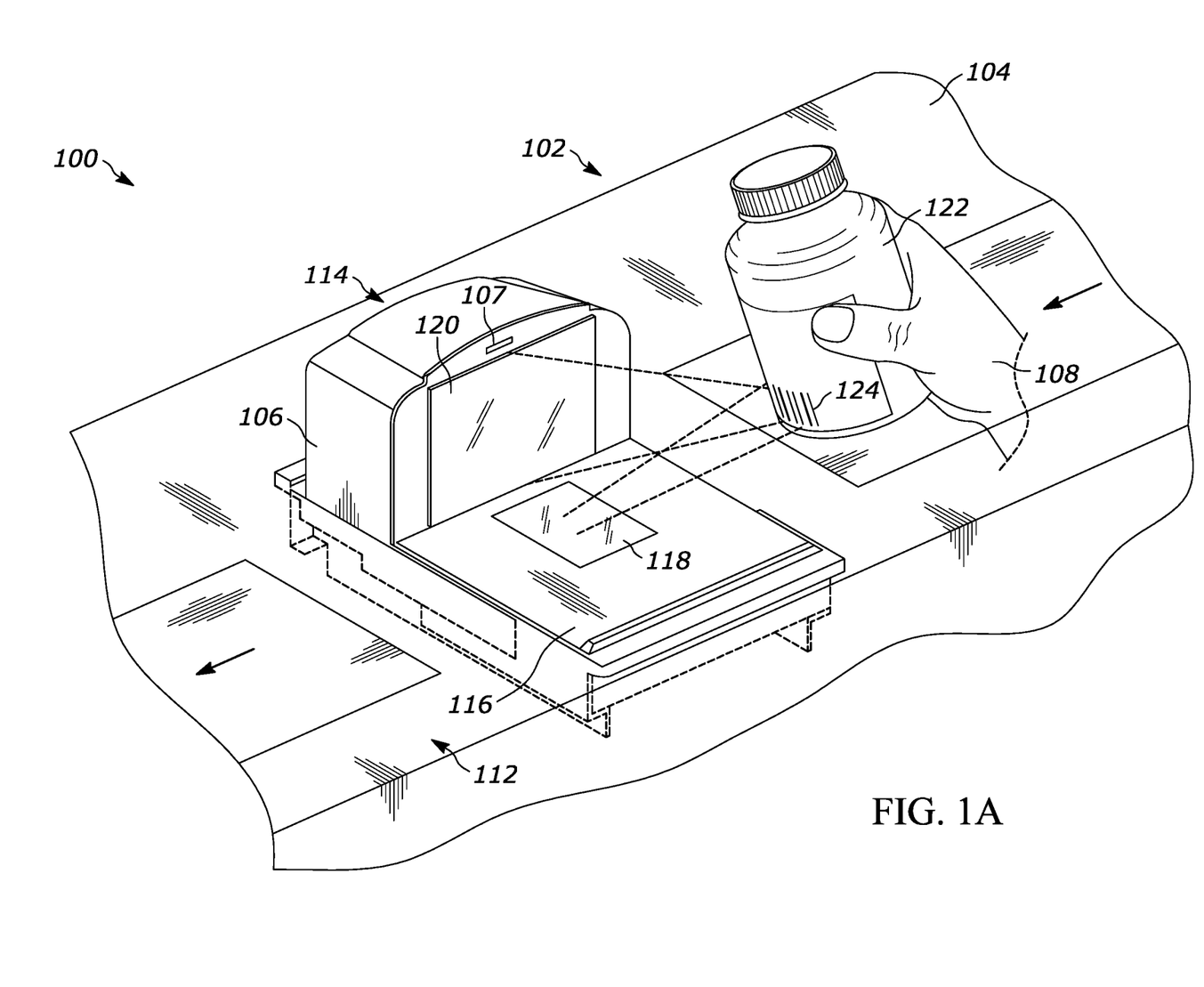
FIG. 1A illustrates a perspective view of an example checkout workstation in accordance with the teachings of this disclosure.

Performing an automatic white balance correction in accordance with the methods of the present disclosure increases the accuracy of object identification performed by an imaging system, which may increase the efficacy of other corresponding functions. For example, an imaging system attempting to detect ticket-switching (i.e., replacing the label of a product with a less expensive product's label in an attempt to purchase the product at the less expensive product's price) will be increasingly capable of making that determination when the image representing the object in the color camera's field of view (FOV) has an accurate color representation FIG. 1A illustrates a perspective view of a point-of-sale (POS) system 100 having a workstation 102 with a counter 104, a bi-optical (also referred to as "bi-optic") barcode reader 106 and an additional camera 107 at least partially positioned within the workstation 102. The camera 107 may be referred to as an image acquisition assembly and may be implemented as a color camera or a camera that is configured to obtain non-barcode data. The POS system 100 is often managed by a store employee such as a clerk 108. However, in other cases the POS system 100 may be a part of a so-called self-checkout lane where instead of a clerk, a customer is responsible for checking out his or her own products.

The barcode reader 106 includes a lower housing 112 and a raised housing 114. The lower housing 112 may be referred to as a first housing portion and the raised housing 114 may be referred to as a tower or a second housing portion. The lower housing 112 includes a top portion 116 with a first optically transmissive window 118 positioned therein along a generally horizontal plane relative to the overall configuration and placement of the barcode reader 106. In some embodiments, the top portion 116 may include a removable or a non-removable platter (e.g., a weighing platter). The top portion 116 can also be viewed as being positioned substantially parallel with the counter 104 surface. As set forth herein, the phrase "substantially parallel" means+/−10° of parallel and/or accounts for manufacturing tolerances. It's worth noting that while, in FIG. 1, the counter 104 and the top portion 116 are illustrated as being about co-planar, that does not have to be the case for the platter and the counter 104 to be considered substantially parallel. In some instances, the counter 104 may be raised or lowered relative to the top surface of the top portion 116, where the top portion 116 is still viewed as being positioned substantially parallel with the counter 104 surface. The raised housing 114 is configured to extend above the top portion 116 and includes a second optically transmissive window 120 positioned in a generally upright plane relative to the top portion 116 and/or the first optically transmissive window 118. Note that references to "upright" include, but are not limited to, vertical. Thus, as an example, something that is upright may deviate from a vertical axis/plane by as much as 45 degrees.

In practice, a product 122, such as for example a bottle, is swiped past the barcode reader 106 such that a barcode 124 associated with the product 122 is digitally read through at least one of the first and second optically transmissive windows 118, 120. This is particularly done by positioning the product 122 within the fields of view (FsOV) of the digital imaging sensor(s) housed inside the barcode reader 106. Additionally, as the product 122 is swiped past the barcode reader 106, the camera 107 obtains image data of the product 122. The image data obtained by the camera 107 may have different uses. For example, the image data can be processed to verify that the product 122 scanned matches the barcode 124 and/or image data can be used to populate a database.

Figure 1B:
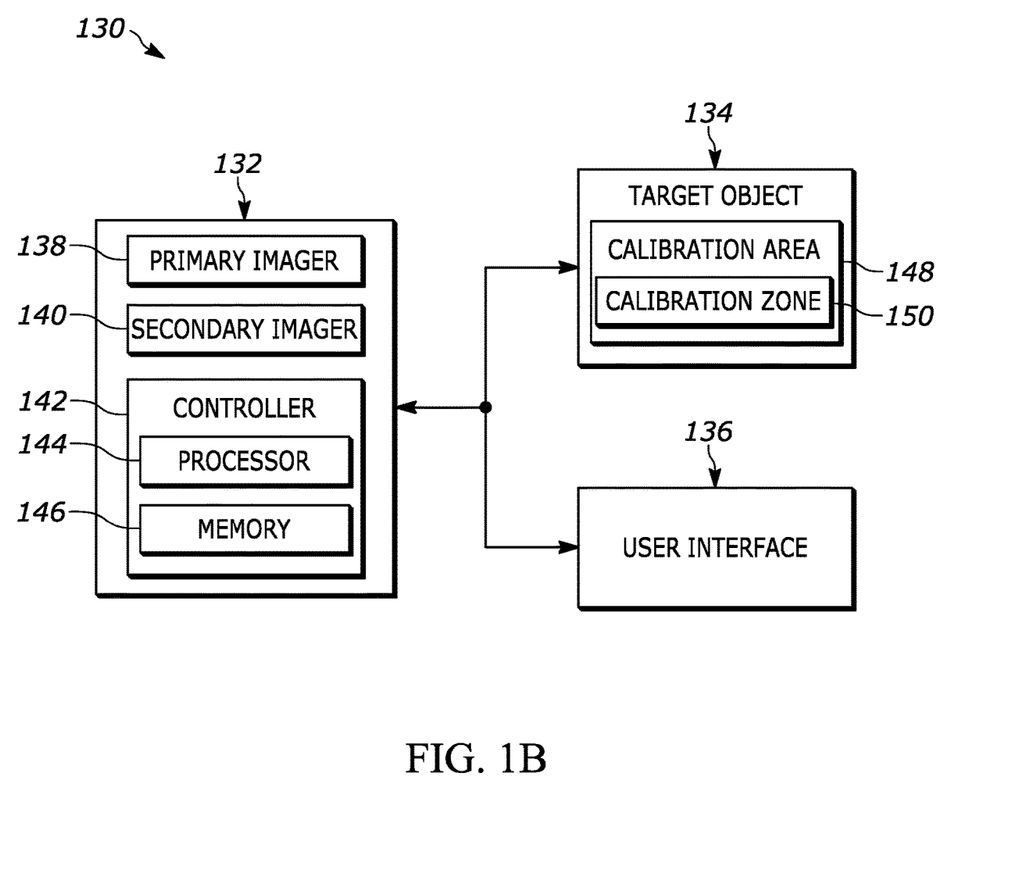
FIG. 1B is a block diagram representative of an operational embodiment of an example system, in accordance with various embodiments of the present disclosure.

FIG. 1B is a block diagram representative of an operational embodiment 130 of an example system 132, in accordance with various embodiments of the present disclosure. The operational embodiment 130 further includes a target object 134 and a user interface 136. The user interface 136 is communicatively coupled with the example system 132. The example system 132 includes a primary imager 138, a secondary imager 140, and a controller 142. The controller 142 contains a processor 144 and a memory 146 (although referenced herein as a "processor" and a "memory," it is to be understood that there may be one or more processors and/or one or more memories). The target object 134 contains a calibration area 148 and a calibration zone 150.

The primary imager 138 is configured to capture a first image of the target object 134. The first image contains the calibration area 148 that is defined by a symbology captured within the first image. The first image further contains the calibration zone 150 within the calibration area 148. The symbology encodes data therein, and the symbology has first-color elements and second-color elements. The calibration zone 150 is defined by at least some of at least one of the first-color elements and second-color elements. In certain embodiments, the primary imager 138 is a monochromatic camera, and the first image is a monochromatic image.

In certain embodiments, the calibration area 148 includes a barcode, and the calibration zone 150 is at least one of (i) one or more second-color elements of the barcode and (ii) a quiet zone surrounding the barcode (e.g., all or part of the blank margin on either side of a bar code defining the beginning and end of a barcode's readable symbology). For example, the calibration zone 150 may be one or more white bars of the barcode included in the calibration area 148. The calibration zone 150 may also be all or part of the quiet zone surrounding the barcode.

In some embodiments, the calibration area 148 includes any one of (i) a product label, (ii) a logo, or (iii) a text box, and the calibration zone 150 is at least one of (i) a quiet zone surrounding the calibration area 148 and (ii) one or more second-color elements within the calibration area 148. To illustrate, the calibration zone 150 may be a quiet zone surrounding or one or more substantially white spaces within (i) a product label, (ii) a logo, or (iii) a text box located on the target object. However, the one or more second-color elements may be any color sufficient such that the second-color elements contrast with the first-color elements to any degree.

The secondary imager 140 is configured to capture a second image of the target object 134. The second image is a multicolor image. In certain embodiments, the secondary imager 140 is a color camera.

The controller 142 is communicatively coupled to the primary imager 138 and the secondary imager 140. The controller 142 is configured to obtain, from the first image, a location of the calibration area 148. For example, and in certain embodiments, the controller 142 may obtain the location of the calibration area 148 in the first image by superimposing a coordinate system over the first image and assigning the calibration area a certain coordinate position within the first image.

The controller 142 is further configured to locate the calibration area 148 in the second image based on the location obtained from the first image. In certain embodiments, the controller 142 is configured to locate the calibration area 148 in the second image based further on a known displacement between the primary imager 138 and the secondary imager 140. For example, the primary imager 138 and the secondary imager 140 may be physically separated in the example system 132 by a known displacement, leading to a corresponding shift in FOV. Accordingly, the location obtained by the controller 142 from the first image would have to be translated based on the known displacement between the imagers when applied to the second image.

The controller 142 is further configured to analyze, in the second image, the calibration zone 150 within the calibration area 148, and calculate at least one white balance compensation bias (i.e., an amount, degree, or other indication of a change in an image's color representation to bring the image's color representation closer to one indicative of natural light) based on the analyzed calibration zone 150. In other words, because the second image is a multicolor image, the controller 142 will calculate the at least one white balance compensation bias based on the second image to determine how much the multicolor image should be adjusted.

The controller 142 is further configured to apply the at least one white balance compensation bias to at least one of the second image and at least one subsequent image. For example, and in certain embodiments, the controller then compares the at least one of the second image and at least one subsequent image to a predetermined color profile. The predetermined color profile includes at least one of (i) a red-green-blue (RGB) color scheme, (ii) a luminance-chrominance (YUV) color scheme, (iii) a hue-saturation-lightness (HSL) color scheme, (iv) a hue-saturation-value (HSV) color scheme, (v) a tristimulus value (CIE) color scheme, and (vi) a cyan-magenta-yellow-black (CMYK) color scheme. Finally, the controller 142 will verify that one or more colors included in the at least one of the second image and at least one subsequent image satisfy a white balance compensation bias threshold based on one or more corresponding colors included in the predetermined color profile.

In some embodiments, the controller 142 is further configured to capture at least one subsequent image of the target object. In these embodiments, the at least one subsequent image is a multicolor image. Further, the at least one subsequent image includes a set of images captured during a presentation of a plurality of target objects (e.g., target object 134). Each of the plurality of target objects is presented within a field of view of either the primary imager 138 or the secondary imager 140 within a predetermined duration.

To illustrate, a customer may purchase four items at a POS station (e.g., POS system 100). As the first item is scanned, the primary imager 138 may capture the first image, and the secondary imager 140 may capture the second image. The at least one subsequent image may be of the first, second, third, or fourth item purchased after the first and second images are captured.

Moreover, each of the purchased items (e.g., second, third, fourth) may be presented successively within the FOV of either the primary or secondary imagers 138, 140 such that the duration between each successive scan does not exceed the predetermined time period. In this example, if the second item is scanned soon enough after the first item (e.g., within the predetermined duration), then the example system 132 may apply the same white balance correction bias to the at least one subsequent image (of the second item) as was calculated based on the second image (of the first item). However, if the second item is scanned long enough after the first item (e.g., outside the predetermined duration), then the example system 132 may calculate a white balance correction bias based on the at least one subsequent image instead of using the white balance correction bias calculated based on the second image.

For example, the system (e.g., example system 132) may have a proximity sensor to sense products entering an imager's 138, 140 FOV. The system may also have a standby period defined by a predetermined duration between the proximity sensor sensing a product in either imager's 138, 140 FOV. Thus, the system may automatically reset the white balance compensation bias when the predetermined duration is exceeded, and may calculate a new white balance compensation bias based on images captured the next time the proximity sensor senses a product entering either imager's 138, 140 FOV.

The controller 142 is then further configured to apply the at least one white balance compensation bias to the at least one subsequent image. The controller 142 will then compare the at least one subsequent image to a predetermined color profile, which includes at least one of (i) a RGB color scheme, (ii) a YUV color scheme, (iii) a HSL color scheme, (iv) a HSV color scheme, (v) a CIE color scheme, and (vi) a CMYK color scheme. Finally, the controller 142 will verify that one or more colors included in the at least one subsequent image satisfy a white balance compensation bias threshold based on one or more corresponding colors included in the predetermined color profile.

In some embodiments, the controller 142 is further configured to analyze a plurality of prior calibration zones. The controller 142 will then determine at least one composite white balance compensation bias from the plurality of prior calibration zones. Finally, the controller 142 will apply the at least one composite white balance compensation bias to at least one of the second image and at least one subsequent image.

For example, in these embodiments, the prior calibration zones may be included in second images captured by the secondary imager 140 of various target objects (e.g., target object 134). The controller 142 may determine the at least one composite white balance compensation bias by averaging the individual white compensation biases associated with each of the plurality of prior calibration zones. Additionally or alternatively, in these embodiments, the controller 142 may determine the at least one composite white balance compensation bias by performing a weighted average, mean, median, or any other suitable calculation or combination of calculations with regard to the individual white compensation biases associated with each of the plurality of prior calibration zones.

In some embodiments, the controller 142 is further configured to obtain at least one prior white balance compensation bias. The controller 142 will then apply the at least one prior white balance compensation bias to the second image. For example, a user may wish to apply a prior white balance compensation bias for a particular and/or predefined period of time. Additionally, a user may wish to apply a consistent white balance compensation bias across a series of images captured during an imaging sequence (e.g., a plurality of images captured over a 1 second duration of a 60 frames per second (FPS) imaging system). Thus, in these embodiments, the controller 142 may obtain at least one prior white balance compensation bias from a second image captured by the secondary imager 140 featuring a target object (e.g., target object 134) after calculating the at least one white balance compensation bias based on the analyzed calibration zone 118.

Figure 2:
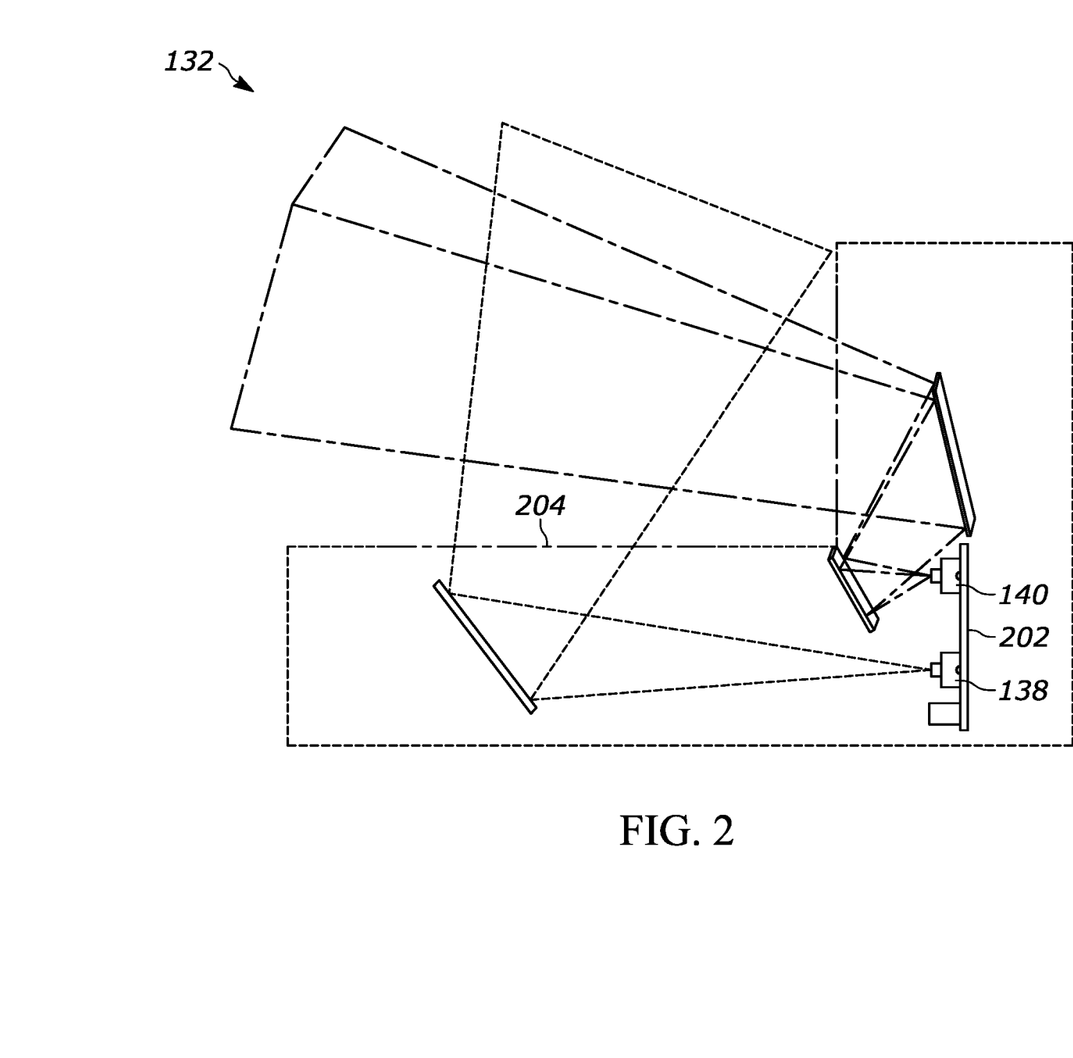
FIG. 2 illustrates a displaced imager configuration, in accordance with an embodiment of the example system of FIG. 1B.

FIG. 2 illustrates a displaced imager configuration, in accordance with an embodiment of the example system 132 of FIG. 1B. As shown in FIG. 2, the example system 132 includes the primary imager 138 and the secondary imager 140, separated by a known displacement 202. The example system 132 further includes a scanning platter 204.

As discussed further herein, the known displacement 202 represents a physical distance between the primary imager 138 and the secondary imager 140. This physical distance is significant because as a target object (e.g., target object 134) passes across the scanning platter 204, the primary imager 138 and the secondary imager 140 will capture the first and second images, respectively, from physically distinct locations. Thus, the first and second images will represent two different perspectives of the target object.

Figure 3:
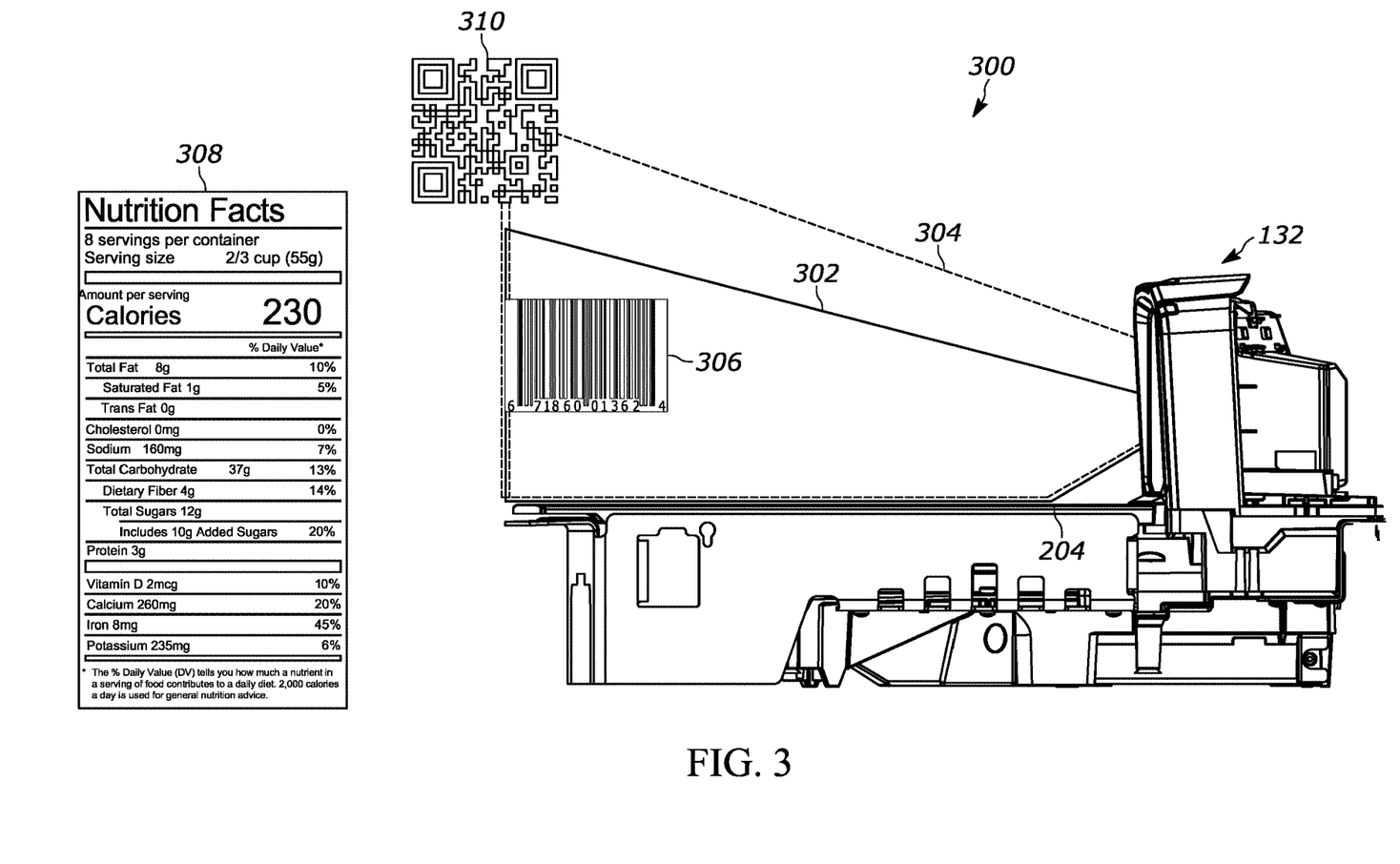
FIG. 3 is a profile view of the example system of FIG. 1B capturing images of various identification labels, in accordance with various embodiments disclosed herein.

For example, and in reference to the operational embodiment 300 of FIG. 3, the primary imager 138 will have a first FOV 302, and the secondary imager 140 will have a second FOV 304. As a target object (e.g., target object 134) passes across the scanning platter 204 and through the first and second FOVs 302, 304, the primary imager 138 and secondary imager 140 will capture the first and second images, respectively, of the target object. The controller 142 will obtain the location of a calibration area 306 from the first image, to locate the calibration area 306 in the second image. However, the calibration area 306 appears lower in the second FOV than in the first FOV. Thus, the controller 142 will use the known displacement 202 between the primary imager 138 and the secondary imager 140 to shift the location of the calibration area 306 obtained from the first image to locate the calibration area 306 in the second image.

Moreover, and as further discussed herein, the example system 132 may perform the various steps of the methods of the present disclosure where the calibration area is, for example, calibration area 306 (e.g., a barcode), calibration area 308 (e.g., a nutrition facts label), calibration area 310 (e.g., a quick response (QR) code), or any other suitable calibration area (e.g., a product logo area, a text box, etc.). Each of the calibration areas 306, 308, and 310 may be affixed to a target object (e.g., target object 134), or may be associated with the target object.

It should be understood that while the example system 132 described in reference to FIGS. 1-3 and depicted in FIGS. 2 and 3 as a bioptic barcode reader, the systems and methods described herein are applicable to any other barcode readers whether stationary or handheld.

Figure 4:
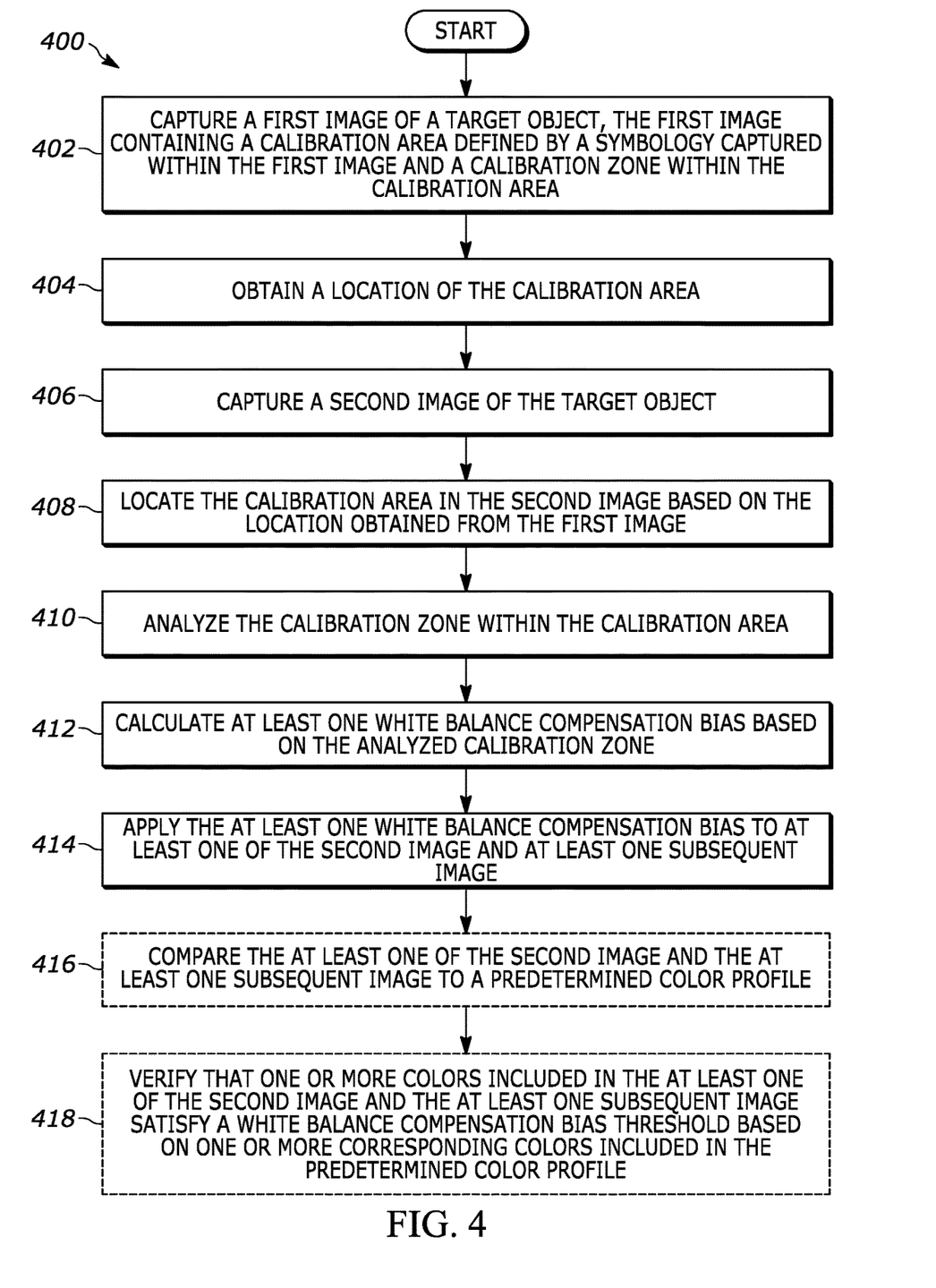
FIG. 4 illustrates a method for automatic white balance correction of color cameras, in accordance with various embodiments disclosed herein.

FIG. 4 illustrates a method 400 for automatic white balance correction of color cameras, in accordance with various embodiments disclosed herein. The method 400 begins at block 402 where, for example, a primary imager (e.g., primary imager 138) captures a first image of a target object, the first image containing a calibration area (e.g., calibration area 148) defined by a symbology captured within the first image and a calibration zone (e.g., calibration zone 150) within the calibration area 148. In certain embodiments, the first image is captured by a monochromatic camera, and the first image is a monochromatic image.

As discussed further herein, the symbology defining the calibration area 148 encodes data, and has first-color elements and second-color elements. For example, the first-color elements may be black bars representing a portion of the encoding symbology of the calibration area 148 (e.g., the black bars/spaces of a barcode, nutrition facts label, text box, QR code, product logo area, etc.), and the second-color elements may be white bars representing another portion of the encoding symbology of the calibration area 148 (e.g., the white bars/spaces of a barcode, nutrition facts label, text box, QR code, product logo area, etc.). Alternatively, the first-color elements and second-color elements may be any suitable color and/or combination of colors.

Further, the calibration zone 150 is defined by at least some of at least one of the first-color elements and the second-color elements. For example, the calibration zone 150 may be defined by part of a white bar/space of a barcode, by part of a black bar/space of the barcode, and/or by a combination of white bars, black bars, or any other combination of colors represented in the first and second-color elements.

In certain embodiments, the calibration area 148 includes a barcode, and the calibration zone 150 is at least one of (i) one or more second-color elements of the barcode and (ii) a quiet zone surrounding the barcode (e.g., all or part of the blank margin on either side of a bar code defining the beginning and end of a barcode's readable symbology). Alternatively, in some embodiments, the calibration area 148 includes any one of (i) a product label, (ii) a logo, or (iii) a text box, and the calibration zone 150 is at least one of (i) a quiet zone surrounding the calibration area 148 and (ii) one or more second-color elements within the calibration area 148.

At block 404, the method 400 continues by obtaining a location of the calibration area 148 from the first image. For example, and as illustrated in FIG. 3, the primary imager 138 may capture the first image, which includes a product label (e.g., a nutrition facts label 308). The controller (e.g., processor 144) may then obtain the location of the calibration area 148 from the first image by identifying the product label's location within the first image. To illustrate, if the product label is located in the bottom left corner of the first image, the processor 144 may identify the location of the calibration area 148 as being in the bottom left corner of the first image. It should be understood that the processor 144 may identify the location of the calibration area 148 without decoding, interpreting, or otherwise analyzing the content of the calibration area 148. For example, if the calibration area 148 is a barcode (e.g., calibration area 306), the processor 144 may identify the barcode without decoding the information contained in the barcode.

Further, once identified, the processor 144 may then assign a location identifier to the calibration area 148 so that it may be located in subsequent images (e.g., the second image captured by the secondary imager 140). For example, and in some embodiments, the processor 144 may assign a coordinate position to the identified location of the calibration area. Block 404 may be performed by, for example, the processor 144 of the example system 132 in FIG. 1B.

At block 406, the method 400 continues by capturing a second image of the target object. The second image is a multicolor image, and in certain embodiments, the second image is captured by a color camera (e.g., secondary imager 140). Moreover, in certain embodiments, that the primary imager and color camera capture the first image and second image either (i) simultaneously or (ii) sequentially. Block 404 may be performed by, for example, the secondary imager 140 of the example system 132 in FIG. 1B.

At block 408, the method 400 continues by locating the calibration area 148 in the second image based on the location obtained from the first image. For example, and as mentioned in reference to block 404, the processor 144 will reference the location information obtained from the first image (e.g., the calibration area 148 is in the bottom left corner of the first image) to locate the calibration area 148 in the second image. The processor 144 may locate the calibration area in the second image by first analyzing the same area of the second image where the calibration area 148 was located in the first image. If the processor 144 cannot locate the calibration area 148 in the second image by analyzing the same location where the calibration area 148 was located in the first image, the processor 144 may adjust its area of analysis accordingly (e.g., expand/shrink the area of analysis, shift the area of analysis, or any combination) to locate the calibration area 148 in the second image. Block 408 may be performed by, for example, the processor 144 of the example system 132 in FIG. 1B.

However, and in certain embodiments, the primary imager 138 and the secondary imager 140 may be physically separated by a known displacement (e.g., known displacement 202). In this case, the processor 144 may be preprogrammed to adjust the area of analysis based on the known displacement 202. For example, if the primary imager 138 is located three inches above or below the secondary imager 140, the processor 144 may be preprogrammed to automatically shift the area of analysis such that the three inch displacement between the cameras is taken into account when locating the calibration area 148 at certain imaging planes.

At block 410, the method 400 continues by analyzing the calibration zone 150 within the calibration area 148. For example, the processor 144 may analyze the at least some of at least one of the first-color elements and second-color elements defining the calibration zone 150. The processor 144 may analyze only the first-color elements, only the second-color elements, or any combination of the first-color elements and/or the second-color elements. Block 410 may be performed by, for example, the processor 144 of the example system 132 in FIG. 1B.

At block 412, the method 400 continues by calculating at least one white balance compensation bias based on the analyzed calibration zone 150. For example, the processor 144 may utilize white balance compensation bias logic to compute the at least one white balance compensation bias. Block 412 may be performed by, for example, the processor 144 of the example system 132 in FIG. 1B.

At block 414, the method 400 continues by applying the at least one white balance compensation bias to at least one of the second image and at least one subsequent image. For example, the processor 144 may apply the at least one white balance compensation bias to the at least one of the second image and at least one subsequent image to adjust the primary colors included in the second image. Applying the at least one white balance compensation bias to the primary colors of the at least one of the second image and at least one subsequent image will yield a more accurate color representation of the primary colors in the at least one of the second image and at least one subsequent image. Thus, the processor 144 will achieve a higher quality image after applying the at least one white balance compensation bias to the at least one of the second image and at least one subsequent image. Block 414 may be performed by, for example, the processor 144 of the example system 132 in FIG. 1B.

At optional block 416, the method 400 continues by comparing the at least one of the second image and the at least one subsequent image to a predetermined color profile. In certain embodiments, the predetermined color profile includes at least one of (i) a RGB color scheme, (ii) a YUV color scheme, (iii) a HSL color scheme, (iv) a HSV color scheme, (v) a CIE color scheme, and (vi) a CMYK color scheme. For example, the memory 146 may store a predetermined color profile, against which, all color images captured by the secondary imager 140 are compared. The processor 144 may then access this predetermined color profile and compare the colors featured in the at least one of the second image and the at least one subsequent image against the predetermined color profile. Optional block 416 may be performed by, for example, the processor 144 of the example system 132 in FIG. 1B.

At optional block 418, the method 400 continues by verifying that the one or more colors included in the at least one of the second image and the at least one subsequent image satisfy a white balance compensation bias threshold based on one or more corresponding colors included in the predetermined color profile. For example, the processor 144 may determine, based on the comparison of the colors featured in the second image, that one or more of the colors in the second image do not satisfy the white balance compensation bias threshold. In this circumstance, the processor 144 may determine that the second image is not of sufficient quality to perform object recognition. The processor 144 may then determine that the secondary imager 140 should capture the at least one subsequent image, such that the controller 142 sends an image capture signal to the secondary imager 140. Optional block 418 may be performed by, for example, the processor 144 of the example system 132 in FIG. 1B.

Alternatively, if the processor 144 determines, based on the comparison of the colors featured in the second image against the predetermined color profile, that one or more of the colors in the second image satisfy the white balance compensation bias threshold, the processor 144 may perform object recognition using the second image.

In certain embodiments, the method 400 further includes capturing at least one subsequent image of the target object by the secondary imager 140. The at least one subsequent image is a multicolor image. In these embodiments, the processor 144 applies the at least one white balance compensation bias to the at least one subsequent image, and compares the at least one subsequent image to a predetermined color profile. The predetermined color profile includes at least one of (i) a RGB color scheme, (ii) a YUV color scheme, (iii) a HSL color scheme, (iv) a HSV color scheme, (v) a CIE color scheme, and (vi) a CMYK color scheme. The processor 144 also verifies that one or more colors included in the at least one subsequent image satisfy a white balance compensation bias threshold based on one or more corresponding colors included in the predetermined color profile.

For example, in certain circumstances, a user may have to apply the at least one white balance compensation bias to at least one subsequent image. To illustrate, if the processor 144 determines that the one or more colors included in the second image do not satisfy the white balance compensation bias threshold, and the processor 144 may then instruct the secondary imager 140 to capture the at least one subsequent image of the target object. To save processing time, the processor 144 may not calculate an at least one white balance compensation bias for the at least one subsequent image because the at least one subsequent image captures the same target object as the second image. Thus, the at least one white balance compensation bias calculated for the second image may be sufficient for the at least one subsequent image. The controller 142 would then instruct the processor 144 to apply the at least one white balance compensation bias calculated for the second image to the at least one subsequent image.

In some embodiments, the method 400 further includes analyzing a plurality of prior calibration zones. The plurality of prior calibration zones may have been included in one or more first images or second images, and may or may not be associated with the same target object. The processor 144 then determines at least one composite white balance compensation bias from the plurality of prior calibration zones, and applies the at least one composite white balance compensation bias to the at least one of the second image and the at least one subsequent image.

For example, in certain circumstances, a user may have to apply a prior white balance compensation bias to a current second image. To illustrate, if the processor 144 determines that the one or more colors included in the second image do not satisfy the white balance compensation bias threshold, and the secondary imager 140 is unable to capture a second image of the target object satisfying the threshold after a certain number of attempts, the controller 142 may instruct the processor 144 to apply the at least one composite white balance compensation bias to the second image.

Additionally or alternatively, if the second image of the target object indicates that the first-color elements and/or the second-color elements are insufficient to accurately perform a white balance compensation analysis (i.e., the first/second-color elements are off-white, beige, cream, or any other non-white color that would distort the white balance compensation analysis), the controller 142 may instruct the processor 144 to apply the at least one composite white balance compensation bias (i.e., a prior white balance compensation bias based on at least one of the first/second-color elements being substantially white to produce a non-distorted white balance compensation analysis) to at least one of the second image and at least one subsequent image. The processor 144 may also resort to a predetermined auto white balance stored in the memory 146 if the processor 144 determines that the first-color elements and/or the second-color elements of the second image are insufficient to accurately perform a white balance compensation analysis.

In some embodiments, the method 400 further includes obtaining at least one prior white balance compensation bias. The processor 144 may then apply the at least one prior white balance compensation bias to at least one of the second image and at least one subsequent image.

For example, in certain circumstances and as discussed herein, a user may have to apply a prior white balance compensation bias to a current second image. To illustrate, if the processor 144 determines that the one or more colors included in the second image do not satisfy the white balance compensation bias threshold, and the secondary imager 140 is unable to capture a second image of the target object satisfying the threshold after a certain number of attempts, the controller 142 may instruct the processor 144 to apply the at least one prior white balance compensation bias to at least one of the second image and at least one subsequent image.

Figure 5:
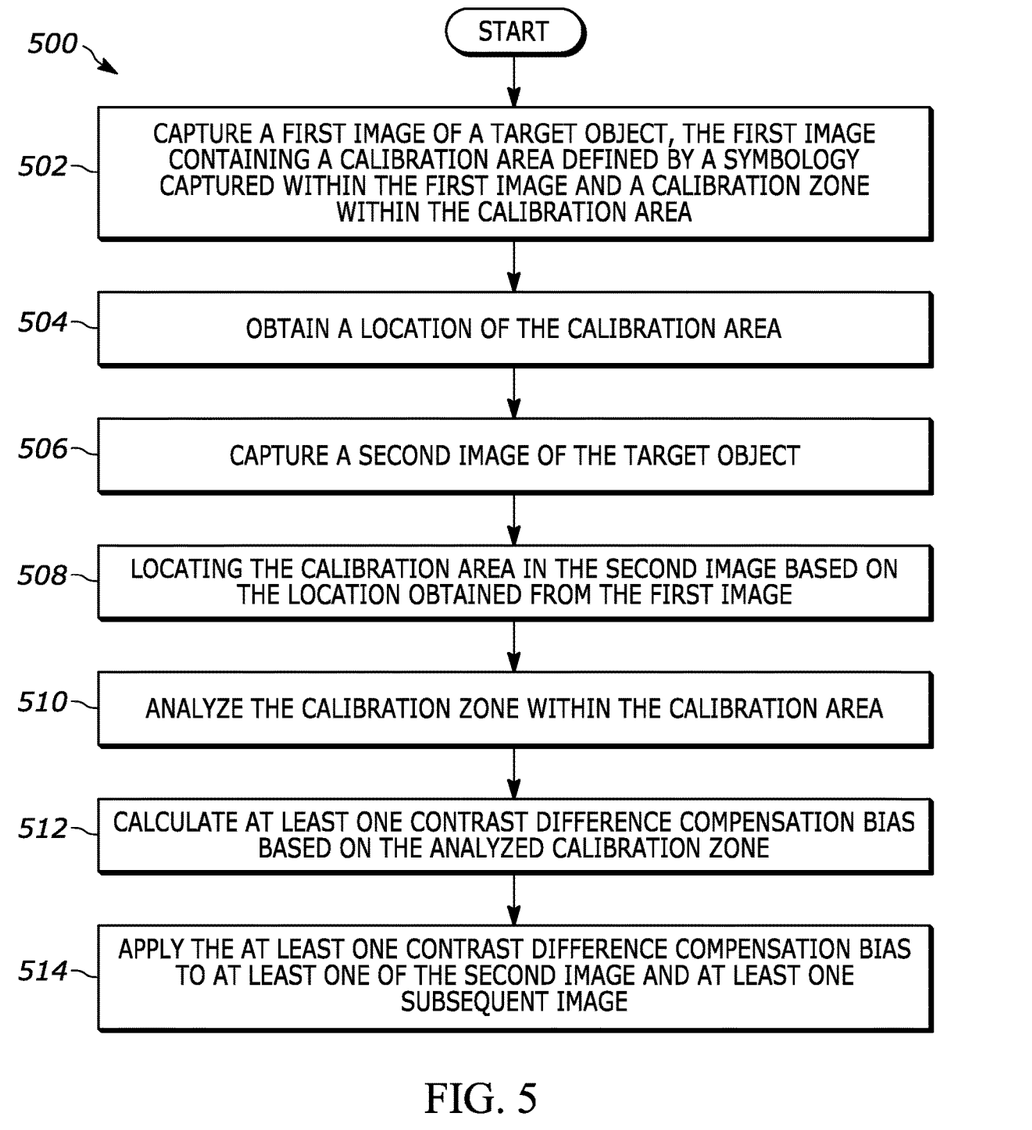
FIG. 5 illustrates a method for automatic adjustment of contrast difference of color cameras, in accordance with various embodiments disclosed herein.

FIG. 5 illustrates a method 500 for automatic adjustment of contrast difference of color cameras, in accordance with various embodiments disclosed herein. The method 500 begins at block 502, where, for example, a primary imager (e.g., primary imager 138) captures a first image of a target object (e.g., target object 134). The first image contains a calibration area (e.g., calibration area 148) defined by a symbology captured within the first image and a calibration zone (e.g., calibration zone 150) within the calibration area 148. The symbology encodes data and has first-color elements and second-color elements. The calibration zone 150 is defined by at least some of at least one of the first-color elements and second-color elements. Block 502 may be performed by, for example, the primary imager 138 of the example system 132 in FIG. 1B.

At block 504, the method 500 continues by obtaining a location of the calibration area 148 from the first image. Block 504 may be performed by, for example, the processor 144 of the example system's 102 controller 142 in FIG. 1B.

At block 506, the method 500 continues by capturing a second image of the target object. The second image is a multicolor image. Block 506 may be performed by, for example, the secondary imager 140 of the example system 132 in FIG. 1B.

At block 508, the method 500 continues by locating the calibration area 148 in the second image based on the location obtained from the first image. Block 508 may be performed by, for example, the processor 144 of the example system 132 in FIG. 1B.

At block 510, the method 500 continues by analyzing the calibration zone 150 within the calibration area 148 of the second image. Block 510 may be performed by, for example, the processor 144 of the example system 132 in FIG. 1B.

At block 512, the method 500 continues by calculating at least one contrast difference compensation bias based on the analyzed calibration zone 150. In certain embodiments, the at least one contrast difference compensation bias corresponds to at least one of (i) white balance and (ii) contrast. For example, the processor 144 may calculate a contrast difference compensation bias based on a detected contrast of the calibration zone 150. If the calibration zone 150 is a traditional black-and-white barcode (e.g., calibration zone included in calibration area 306), and the calibration zone 150 has a low contrast, this may indicate the contrast of the second image needs to be substantially adjusted. Thus, the processor 144 may calculate the at least one contrast difference compensation bias to be relatively high to account for the low contrast observed in the calibration zone 150. Similarly, if the processor 144 observes a contrast corresponding to the calibration zone 150 that is higher than normally expected, the processor 144 may calculate the at least one contrast difference compensation bias to be relatively low to account for the high contrast observed in the calibration zone 150. Block 512 may be performed by, for example, the processor 144 of the example system 132 in FIG. 1B.

At block 514, the method 500 continues by applying the at least one contrast difference compensation bias to at least one of the second image and at least one subsequent image. Block 514 may be performed by, for example, the processor 144 of the example system 132 in FIG. 1B.

It should be understood that, for any of the methods disclosed herein, the steps described may be performed in any order, or repeated any number of times to achieve a desired result. Moreover, the steps described for each method may be performed by at least one component of the example system 132 and/or components of the operational embodiment 130.

The data or information captured from either the primary imager 138 and/or the secondary imager 140 may be transmitted to POS stations (including, e.g., user interface 136), servers, or other processing devices for a variety of purposes including, e.g., product purchases, data storage, inventory purposes, etc. Example system 132 includes a cabling interface for transmission of such data or information. In various embodiments, example system 132 may support several data transmission interfaces including, for example, USB, Standard RS-232, IBM 468X/469X, Simple Serial Interface (SSI), or other similar data transmission interfaces standards.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for automatic white balance correction of color cameras, comprising:
    capturing a first image of a target object, the first image containing a calibration area defined by a symbology captured within the first image and a calibration zone within the calibration area, the symbology encoding data therein, the symbology having first-color elements and second-color elements, the calibration zone being defined by at least some of at least one of the first-color elements and second-color elements;
    obtaining, from the first image, a location of the calibration area;
    capturing a second image of the target object, the second image being a multicolor image;
    locating the calibration area in the second image based on the location obtained from the first image;
    analyzing, in the second image, the calibration zone within the calibration area; and
    calculating at least one white balance compensation bias based on the analyzed calibration zone; and
    applying the at least one white balance compensation bias to at least one of the second image and at least one subsequent image.

2. The method of claim 1, wherein:
    the first image is captured by a monochromatic camera, and is a monochromatic image; and the second image is captured by a color camera, wherein the first image and the second image are captured either (i) simultaneously or (ii) sequentially, the calibration zone is located in the second image based further on a known displacement between the color camera and the monochromatic camera, and the location of the calibration area is a coordinate position of the calibration area.

3. The method of claim 2, wherein the at least one subsequent image includes a set of images captured during a presentation of a plurality of target objects, wherein each of the plurality of targets is presented within a field of view of either the monochromatic camera or the color camera within a predetermined duration.

4. The method of claim 1, wherein the calibration area includes a barcode, and the calibration zone is at least one of (i) one or more second-color elements of the barcode and (ii) a quiet zone surrounding the barcode.

5. The method of claim 1, wherein the calibration area includes any one of (i) a product label, (ii) a logo, or (iii) a text box, and the calibration zone is at least one of (i) a quiet zone surrounding the calibration area and (ii) one or more second-color elements within the calibration area.

6. The method of claim 1, further comprising:
applying the at least one white balance compensation bias to at least one of the second image and the at least one subsequent image;
comparing the at least one of the second image and the at least one subsequent image to a predetermined color profile, wherein the predetermined color profile includes at least one of (i) a red-green-blue (RGB) color scheme, (ii) a luminance-chrominance (YUV) color scheme, (iii) a hue-saturation-lightness (HSL) color scheme, (iv) a hue-saturation-value (HSV) color scheme, (v) a tristimulus value (CIE) color scheme, and (vi) a cyan-magenta-yellow-black (CMYK) color scheme; and
verifying that one or more colors included in the at least one of the second image and the at least one subsequent image satisfy a white balance compensation bias threshold based on one or more corresponding colors included in the predetermined color profile.

7. The method of claim 1, further comprising:
capturing the at least one subsequent image of the target object, the at least one subsequent image being a multicolor image;
applying the at least one white balance compensation bias to the at least one subsequent image;
comparing the at least one subsequent image to a predetermined color profile, wherein the predetermined color profile includes at least one of (i) a red-green-blue (RGB) color scheme, (ii) a luminance-chrominance (YUV) color scheme, (iii) a hue-saturation-lightness (HSL) color scheme, (iv) a hue-saturation-value (HSV) color scheme, (v) a tristimulus value (CIE) color scheme, and (vi) a cyan-magenta-yellow-black (CMYK) color scheme; and
verifying that one or more colors included in the at least one subsequent image satisfy a white balance compensation bias threshold based on one or more corresponding colors included in the predetermined color profile.

8. The method of claim 1, further comprising:
analyzing a plurality of prior calibration zones;
determining at least one composite white balance compensation bias from the plurality of prior calibration zones; and
applying the at least one composite white balance compensation bias to the at least one of the second image and the at least one subsequent image.

9. The method of claim 1, further comprising:
obtaining at least one prior white balance compensation bias;
applying the at least one prior white balance compensation bias to the at least one of the second image and the at least one subsequent image.

10. A system for automatic white balance correction of color cameras, comprising:
a primary imager configured to capture a first image of a target object, the first image containing a calibration area defined by a symbology captured within the first image and a calibration zone within the calibration area, the symbology encoding data therein, the symbology having first-color elements and second-color elements, the calibration zone being defined by at least some of at least one of the first-color elements and second-color elements;
a secondary imager configured to capture a second image of the target object, the second image being a multicolor image; and
a controller communicatively coupled to the primary imager and the secondary imager, wherein the controller is configured to:
obtain, from the first image, a location of the calibration area;
locate the calibration area in the second image based on the location obtained from the first image;
analyze, in the second image, the calibration zone within the calibration area; and
calculate at least one white balance compensation bias based on the analyzed calibration zone; and
apply the at least one white balance compensation bias to at least one of the second image and at least one subsequent image.

11. The system of claim 10, wherein:
the primary imager is a monochromatic camera, and the first image is a monochromatic image; and
the secondary imager is a color camera, wherein the primary imager and the secondary imager capture the first image and the second image either (i) simultaneously or (ii) sequentially, the calibration area is located in the second image based further on a known displacement between the primary imager and the secondary imager, and the location of the calibration area is a coordinate position of the calibration area.

12. The system of claim 11, wherein the at least one subsequent image includes a set of images captured during a presentation of a plurality of target objects, wherein each of the plurality of targets is presented within a field of view of either the primary imager or the secondary imager within a predetermined duration.

13. The system of claim 10, wherein the calibration area includes a barcode, and the calibration zone is at least one of (i) one or more second-color elements of the barcode and (ii) a quiet zone surrounding the barcode.

14. The system of claim 10, wherein the calibration area includes any one of (i) a product label, (ii) a logo, or (iii) a text box, and the calibration zone is at least one of (i) a quiet zone surrounding the calibration area and (ii) one or more second-color elements within the calibration area.

15. The system of claim 10, wherein the controller is further configured to:

apply the at least one white balance compensation bias to at least one of the second image and the at least one subsequent image;

compare the at least one of the second image and the at least one subsequent image to a predetermined color profile, wherein the predetermined color profile includes at least one of (i) a red-green-blue (RGB) color scheme, (ii) a luminance-chrominance (YUV) color scheme, (iii) a hue-saturation-lightness (HSL) color scheme, (iv) a hue-saturation-value (HSV) color scheme, (v) a tristimulus value (CIE) color scheme, and (vi) a cyan-magenta-yellow-black (CMYK) color scheme; and verify that one or more colors included in the at least one of the second image and the at least one subsequent image satisfy a white balance compensation bias threshold based on one or more corresponding colors included in the predetermined color profile.

16. The system of claim 10, wherein the controller is further configured to:

capture the at least one subsequent image of the target object, the at least one subsequent image being a multicolor image;

apply the at least one white balance compensation bias to the at least one subsequent image;

compare the at least one subsequent image to a predetermined color profile, wherein the predetermined color profile includes at least one of (i) a red-green-blue (RGB) color scheme, (ii) a luminance-chrominance (YUV) color scheme, (iii) a hue-saturation-lightness (HSL) color scheme, (iv) a hue-saturation-value (HSV) color scheme, (v) a tristimulus value (CIE) color scheme, and (vi) a cyan-magenta-yellow-black (CMYK) color scheme; and verify that one or more colors included in the at least one subsequent image satisfy a white balance compensation bias threshold based on one or more corresponding colors included in the predetermined color profile.

17. The system of claim 10, wherein the controller is further configured to:

analyze a plurality of prior calibration zones;

determine at least one composite white balance compensation bias from the plurality of prior calibration zones; and apply the at least one composite white balance compensation bias to the at least one of the second image and the at least one subsequent image.

18. The system of claim 10, wherein the controller is further configured to:

obtain at least one prior white balance compensation bias;

apply the at least one prior white balance compensation bias to the at least one of the second image and the at least one subsequent image.

19. A method for automatic adjustment of contrast difference of color cameras, comprising:

capturing a first image of a target object, the first image containing a calibration area defined by a symbology captured within the first image and a calibration zone within the calibration area, the symbology encoding data therein, the symbology having first-color elements and second-color elements, the calibration zone being defined by at least some of at least one of the first-color elements and second-color elements;

obtaining, from the first image, a location of the calibration area;

capturing a second image of the target object, the second image being a multicolor image;

locating the calibration area in the second image based on the location obtained from the first image;

analyzing, in the second image, the calibration zone within the calibration area; and calculating at least one contrast difference compensation bias based on the analyzed calibration zone; and applying, the at least one contrast difference compensation bias to at least one of the second image and at least one subsequent image.

20. The method of claim 19, wherein the at least one contrast difference compensation bias corresponds to at least one of (i) white balance and (ii) contrast.

* * * * *